UNITED STATES PATENT OFFICE.

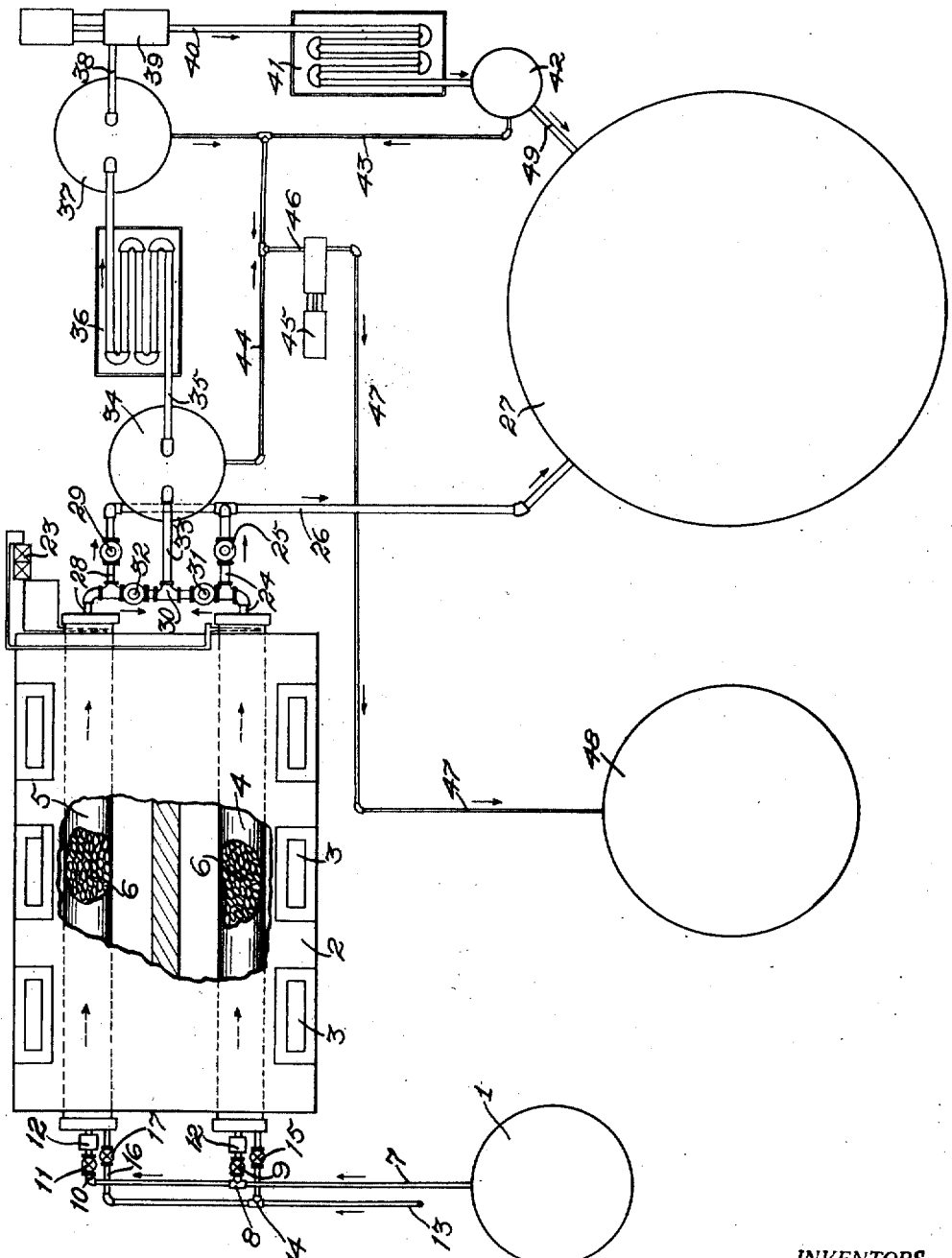

FREDERICK WILLIAM MANN AND MARVIN LEE CHAPPELL, OF BERKELEY, CALIFORNIA, ASSIGNORS TO STANDARD OIL COMPANY, OF RICHMOND, CALIFORNIA, A CORPORATION OF CALIFORNIA.

PROCESS FOR THE PRODUCTION OF AROMATIC BODIES AND GAS FROM PETROLEUM-OILS.

1,214,204.　　　　　Specification of Letters Patent.　　Patented Jan. 30, 1917.

Application filed February 3, 1916. Serial No. 75,918.

*To all whom it may concern:*

Be it known that we, FREDERICK WILLIAM MANN and MARVIN LEE CHAPPELL, citizens of the United States, residing at Berkeley, in the county of Alameda and State of California, have invented certain new and useful Improvements in Processes for the Production of Aromatic Bodies and Gas from Petroleum-Oils, of which the following is a specification.

Our invention relates to the art of manufacturing aromatic bodies and gas from petroleum oils containing oils of the carbocyclic series, and is particularly applicable for the production of benzol, toluol, xylol and other aromatic bodies, which are used extensively in the manufacture of dyes, explosives and drugs. The carbocyclic series consists of aromatic bodies, naphthenes, and other ring compounds, all of which are converted, or partly converted into aromatic oils by the process,—benzol, toluol, xylol, etc.

Our invention consists in the dehydrogenation of such petroleum oils, under pressure below atmospheric, at high temperatures, in the presence of air and in the presence also of a contact substance. In the best practice of our process, the essentials are: a pressure of from 1 to 4 inches of mercury below atmospheric pressure, that is, 734.6 to 658.4 millimeters of mercury absolute pressure; a temperature ranging from 600 to 750 degrees centigrade; a volume of air from 500 to 800 cubic feet for each 15 or 20 gallons of oil introduced; and a contact substance of catalytic nature composed of the lower oxid of a metal or metals, preferably the lower oxid of nickel. The catalyzer is prepared by impregnating porous material, such as firebrick, pumice-stone, etc., with the soluble salts of nickel or iron or copper or with mixtures of these soluble salts. We prefer to use the nitrates of these metals for the impregnation of such porous materials, and if one metal alone is employed, we prefer, as, we have before stated, to use nickel.

After the impregnation, the contact mass is heated to a temperature ranging from 500 to 600 degrees centigrade, in the presence of a reducing agent, such as the vapors of petroleum oils, carbon monoxid, and water vapor, which are formed by the chemical action of petroleum oils and air, according to the general reaction

By the action of such reducing agents the nitrates of the metals are converted into their lower oxids, thus:—

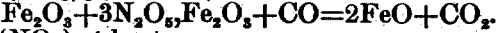
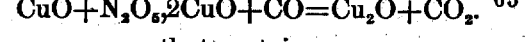

We are aware that certain processes are now well known for the partial conversion of petroleum oils at atmospheric and above atmospheric pressure, into oils of low boiling points which contain small percentages of benzol and toluol, but we have found that it is not commercially profitable to separate this benzol and toluol from the undesirable oils. Such oils can be used only for solvents and as fuel in internal combustion engines. Further, some of the undesirable oils formed under atmospheric or above atmospheric pressure have similar boiling points to benzol and toluol, and can be nitrated, but explode when heated to the boiling point of nitro-benzol. In general, we employ a reduced atmospheric pressure as stated, to prevent the formation of these undesirable compounds, which cannot be separated from benzol and toluol by fractional distillation, and which, when nitrated, form dangerous explosives. A reduced pressure of more than 4 inches of mercury below atmospheric may be employed with equally as good results, but such reduced pressures are more expensive to maintain.

In the accompanying drawing, to which reference is hereby made, the figure represents an apparatus in which the process may be carried out.

1 is an oil storage tank.

2 is a shell having heating means indicated by the furnaces 3. Within this shell are two retorts 4 and 5, which, as seen through the broken out portion, contain the catalytic mass indicated by 6.

From the storage tank 1 leads a pipe 7, which, by a branch pipe 8, controlled by a valve 9, communicates with one end of the retort 4, and by another branch pipe 10 controlled by a valve 11, communicates with the retort 5. In each of the branches 8 and 10 is a look-box 12 through which the size of the oil-stream can be seen.

13 is an air pipe which leads from any suitable source of air, said pipe communicating by a branch 14, controlled by a valve 15, with the retort 4, and by another branch 16, controlled by a valve 17, communicating with the retort 5.

23 is a pyrometer to indicate the temperature in the retorts.

From the retort 4 issues a pipe 24, having a valve 25, said pipe connecting with a pipe 26 leading to gas-holder 27. From the retort 5 issues a pipe 28, having a valve 29, said pipe connecting with the pipe 26 which leads to the gas-holder 27.

The two pipes 24 and 28 are directly connected by a pipe 30 having a valve 31 and another valve 32, one valve being at each side of a pipe 33 which connects the pipe 30 with the top of a tank 34. From the top of said tank 34 leads a pipe 35 which is coiled in a condenser box 36, and, emerging therefrom, leads into the top of a receiver 37. From the top of this receiver leads the suction pipe 38 of a compressor 39, the discharge pipe 40 of which is coiled in a condenser box 41, and emerging therefrom, leads into a receiver 42. The receivers 37 and 42 are connected by a pipe 43. The tank 34 is connected by a pipe 44 with the pipe 43.

45 is a pump which draws from the pipe 44 by a pipe 46, and discharges by a pipe 47 into a storage tank 48. The receiver 42 is connected with the gas-holder 27 by a pipe 49. The arrows indicate the courses of the fluids.

Our process is carried out in this apparatus as follows:—Petroleum oils coming from the storage tank 1 flow through the pipe 7 and the branch 8 into the retort 4. This flow may be effected either by gravitation or under pump pressure, and the oil may be introduced either in liquid state into the retort, or in the form of a vapor spray or gas, and with a certain regulated quantity of air, namely 500 to 800 cubic feet for each 15 to 20 gallons of oil introduced. This air is admitted through pipe 13 and branch 14 and is regulated by means of valve 15. If the petroleum oils in liquid form are used, then the size of their stream can be observed through the look-box 12. The temperature inside the retorts is maintained at from 600 to 750 degrees centigrade. At the same time they are kept under a pressure of from 1 to 4 inches of mercury below the atmospheric pressure, that is, 734.6 to 658.4 millimeters of mercury absolute pressure. This pressure below the atmospheric is maintained by means of the suction pipe 38 of the compressor 39. The catalytic mass 6 in the retort becomes coated with carbon, after the oil has been passing through it for some time. It is necessary to clean the catalyzer at the end of each run of forty or eightly minutes duration. This is accomplished by closing the valve 9 in the branch pipe 8 whereby the flow of petroleum oils to the retort 4 is interrupted. Simultaneously the valve 11 in the branch pipe 10 is opened in order to start the flow of petroleum oils to the retort 5, along with air introduced through pipe 13 and branch 16, and regulated by valve 17, both oil and air being in the proportions as above stated with regard to their admission to retort 4. At the same time the valve 25 controlling the discharge pipe 24 from the retort 4 is opened, and the valve 31 in the connecting pipe 30 is closed. Then the supply of air to retort 4 is increased from the pipe 13 and branch 14 by regulating it with valve 15. The air acts on the carbon coating of the catalytic mass according to the reaction, $$C+O=CO.$$

The temperature in the retort is kept between 600 and 750 degrees centigrade during the oxidation of the carbon. The amount of air is so regulated that only carbon monoxid and little carbon dioxid are formed. The gases pass through the pipe 24, (the valve 25 being open) and the pipe 26 into the gas-holder 27. At the end of twenty minutes the catalytic-mass is freed from its coating of carbon. The quantity of air is then reduced to a point between 500 and 800 cubic feet, and petroleum oil, oil spray or oil vapor is again turned into the retort 4. In like manner the operation of cleaning the catalyzer takes place in retort 5, at the proper time.

The passage of the petroleum oils through the catalytic material, as described, produces 20% to 45% of a permanent hydrocarbon gas and 40% to 75% of aromatic bodies which pass from the retorts by the pipes 24 and 28, connection 30 and pipe 33 into the tank 34, where a portion of said bodies is condensed. From the tank 34, the uncondensed aromatic bodies and the gas pass through the condensing coil of pipe 35 where more of said bodies are condensed, and run into the receiver 37. The permanent gas retains a portion of the light aromatic oils, which are removed from the receiver 37, by the compressor 39, and being condensed in the coil of pipe 40, are collected in the receiver 42, from which the permanent gas enters the gas-holder 27, through the pipe 49. The aromatic bodies thus produced and collected in the tank 34 and receivers 37 and 42 are pumped into the storage tank 48, by means of the pump 45 and its connections. Finally they are treated and fractionated by well known methods.

We claim:—

1. The process of producing aromatic bodies and gas which consists in the dehydrogenation of petroleum oils containing oils of the carbocyclic series, under a pressure below atmospheric, at temperatures ranging between 600 and 750 degrees centigrade, in the presence of air and of a contact substance.

2. The process of producing aromatic bodies and gas which consists in the dehydrogenation of petroleum oils containing oils of the carbocyclic series, under a pressure below atmospheric, at temperatures ranging between 600 and 750 degrees centigrade, in the presence of a volume of air ranging from 500 to 800 cubic feet for each 15 or 20 gallons of oil subjected to treatment, and also in the presence of a contact substance.

3. The process of producing aromatic bodies and gas which consists in the dehydrogenation of petroleum oils containing oils of the carbocyclic series, under a pressure of from 1 to 4 inches of mercury below atmospheric pressure, at temperatures ranging between 600 and 750 degrees centigrade, in the presence of a volume of air ranging from 500 to 800 cubic feet for each 15 or 20 gallons of oil subjected to treatment, and also in the presence of a contact substance.

4. The process of producing aromatic bodies and gas which consists in the dehydrogenation of petroleum oils, containing oils of the carbocyclic series, under a pressure below atmospheric, at temperatures ranging between 600 and 750 degrees centigrade, in the presence of air and of the lower oxid of nickel.

5. The process of producing aromatic bodies and gas which consists in the dehydrogenation of petroleum oils containing oils of the carbocyclic series, under a pressure below atmospheric, at temperatures ranging between 600 and 750 degrees centigrade, in the presence of a volume of air ranging from 500 to 800 cubic feet for each 15 or 20 gallons of oil subjected to treatment, and also in the presence of the lower oxid of nickel.

6. The process of producing aromatic bodies and gas which consists in the dehydrogenation of petroleum oils containing oils of the carbocyclic series, under a pressure of from 1 to 4 inches of mercury below atmospheric pressure, at temperatures ranging between 600 and 750 degrees centigrade, in the presence of a volume of air ranging from 500 to 800 cubic feet for each 15 or 20 gallons of oil subjected to treatment, and also in the presence of the lower oxid of nickel.

7. The process of producing aromatic bodies and gas which consists in the dehydrogenation of petroleum oils containing oils of the carbocyclic series, under a pressure below atmospheric, at temperatures ranging between 600 and 750 degrees centigrade, in the presence of air and of the lower oxid of a metal adapted for dehydrogenation and molecular re-arrangement as described.

In testimony whereof we have signed our names to this specification in the presence of two subscribing witnesses.

FREDERICK WILLIAM MANN.
MARVIN LEE CHAPPELL.

Witnesses:
Wm. F. Booth,
D. B. Richards.